United States Patent

Bruder et al.

[11] 4,353,833
[45] Oct. 12, 1982

[54] CATIONIC DYES

[75] Inventors: Horst Bruder, Ludwigshafen; Hans-Juergen Degen, Lorsch; Franz Feichtmayr, Ludwigshafen; Klaus Grychtol, Bad Duerkheim; Udo Mayer, Frankenthal, all of Fed. Rep. of Germany

[73] Assignee: BASF Aktiengesellschaft, Ludwigshafen, Fed. Rep. of Germany

[21] Appl. No.: 206,254

[22] Filed: Nov. 12, 1980

[51] Int. Cl.³ .................... C07C 15/16; C09B 11/10
[52] U.S. Cl. .................... 260/386; 260/389; 260/319.1; 544/296; 544/301; 544/123; 544/127; 544/133; 544/143; 546/112; 548/190; 548/193; 548/358
[58] Field of Search .................... 260/386, 389, 319.1; 544/296, 301, 123, 127; 546/112; 548/190, 193, 358

[56] References Cited

U.S. PATENT DOCUMENTS

| | | |
|---|---|---|
| 1,629,885 | 5/1927 | Poliker et al. |
| 3,047,632 | 7/1962 | Harbort et al. .................... 260/389 |
| 3,133,084 | 5/1964 | Martin .................... 544/301 |
| 3,211,757 | 10/1965 | Schäfer et al. .................... 260/389 |
| 3,221,007 | 11/1965 | Shen .................... 260/319.1 |
| 3,714,184 | 1/1973 | Kremer .................... 548/358 |
| 4,053,651 | 10/1977 | Ondette et al. .................... 260/319.1 |

FOREIGN PATENT DOCUMENTS 2338151 2/1974 Fed. Rep. of Germany .
2005291 4/1979 United Kingdom .

*Primary Examiner*—Winston A. Douglas
*Assistant Examiner*—Raymond Covington
*Attorney, Agent, or Firm*—Oblon, Fisher, Spivak, McClelland & Maier

[57] ABSTRACT

Compounds of the general formula I

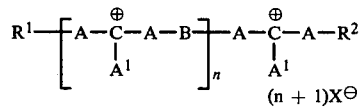

where the radicals

A, $A^1$ and B are identical or different and

A is unsubstituted or substituted benzene or heteroaromatic, $A^1$, if n=1, is unsubstituted or substituted heteroaromatic or is aryl which is unsubstituted or substituted by alkyl, aryl, cycloalkyl, chlorine, bromine, hydroxyl, alkoxy, aryloxy, nitro, hydroxycarbonyl, alkoxycarbonyl, or aminocarbonyl, and, if n>1, $A^1$ may also be aryl substituted by unsubstituted or substituted amino, B is a bridge member of the formula

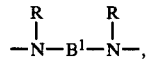

$B^1$ is a bridge member which may or may not be quaternized, $R^1$ and $R^2$ are hydrogen, unsubstituted or substituted alkyl, cycloalkyl, aryl, alkoxy or amino, n is an integer equal to or greater than 1 and $X^\ominus$ is an anion.

The compounds according to the invention are preferably used for coloring paper pulp.

1 Claim, No Drawings

CATIONIC DYES

The present invention relates to compounds of the general formula I

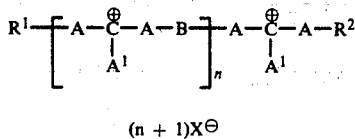

$$(n + 1)X^{\ominus}$$

where the radicals

A, $A^1$ and B are identical or different and

A is unsubstituted or substituted arylene or hetarylene, $A^1$, if n=1, is unsubstituted or substituted hetaryl or is aryl which is unsubstituted or substituted by alkyl, aryl, cycloalkyl, chlorine, bromine, hydroxyl, alkoxy, aryloxy, nitro, hydroxycarbonyl, alkoxycarbonyl or aminocarbonyl, and, if n>1, $A^1$ may also be aryl substituted by unsubstituted or substituted amino, B is a bridge member of the formula

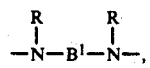

where the R's are identical or different and each is hydrogen, or is $C_1$-$C_4$-alkyl which is unsubstituted or substituted by chlorine, bromine, hydroxyl, $C_1$-$C_4$-alkoxy, phenyl or tolyl, or is cycloalkyl, phenyl or tolyl, $B^1$ is a bridge member which may or may not be quaternized, $R^1$ and $R^2$ are hydrogen, unsubstituted or substituted alkyl, cycloalkyl, aryl, alkoxy or amino, n is an integer and $X^{\theta}$ is an anion.

The radicals A are preferably derived from the benzene series. Specific examples are:

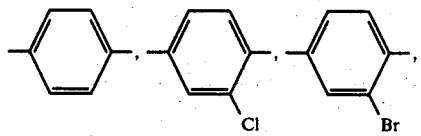

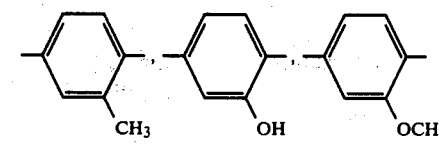

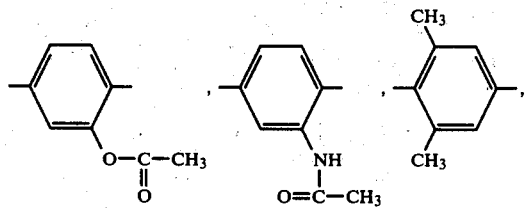

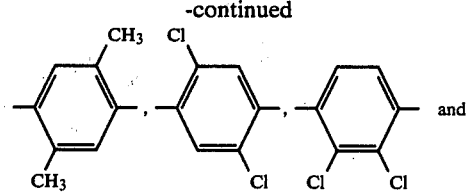

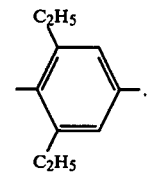

Furthermore, $R^1$—A and $R^2$—A may be, for example,

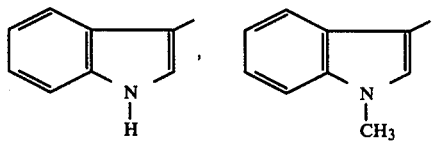

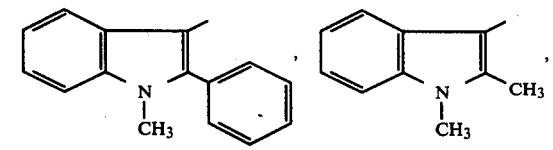

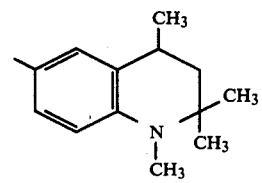

where R has the stated meanings.

Particularly suitable radicals $A^1$ are:

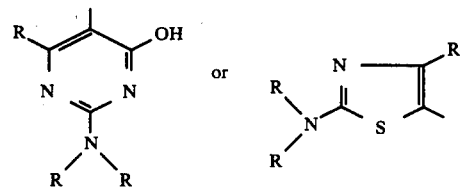

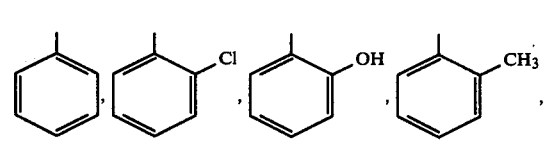

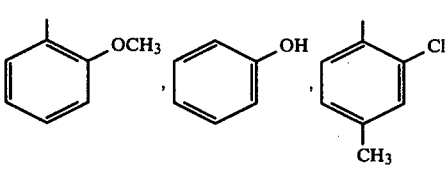

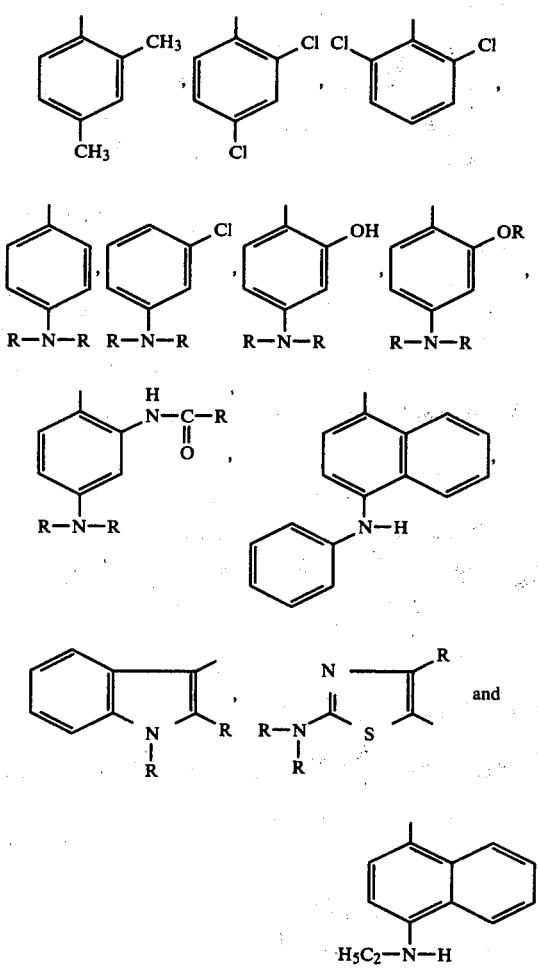

Bridge members $B^1$ may be symmetrical or unsymmetrical; they may be aliphatic or aromatic and may contain hetero-atoms. Examples include alkylene radicals which may or may not be interrupted by oxygen, —NH—, sulfur, carbamyl, carbonyloxy,

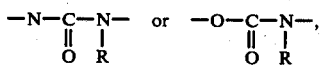

unsubstituted and substituted phenylene, diphenylene and naphthylene radicals, and saturated cycloalkylene or heterocyclic radicals. Specific examples of $B^1$ are:

$C_2H_4OCOOC_2H_4$ $C_3H_6OCOOC_3H_6$ $C_2H_4HNCONHC_2H_4$ $C_3H_6HNCONHC_3H_6$ $C_2H_4OCONHC_6H_4NHCOOC_2H_4$ $C_3H_6OCONHC_6H_4NHCOOC_3H_6$

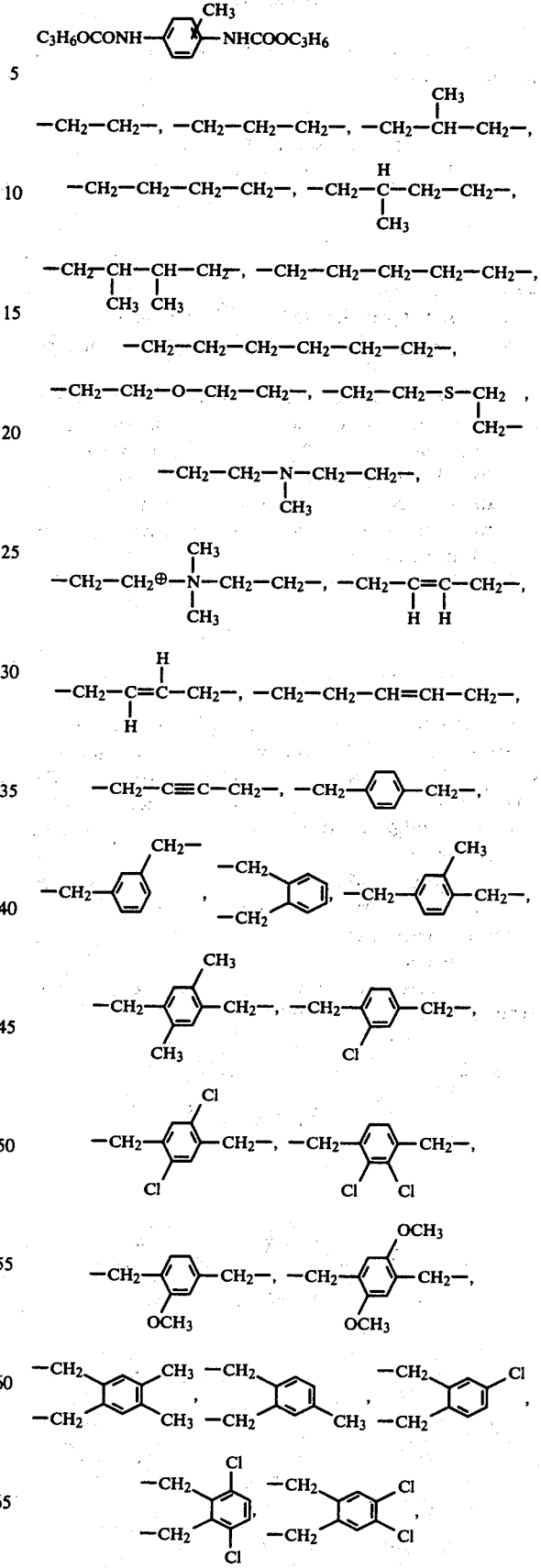

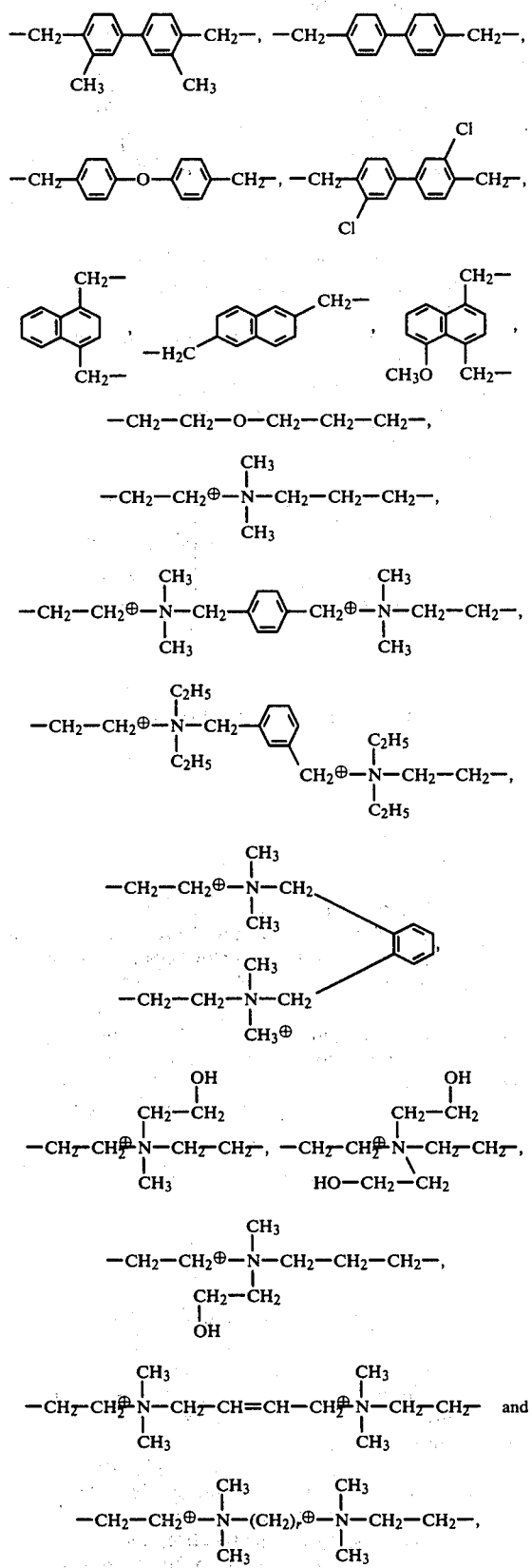

where r is a number from 2 to 8, preferably from 2 to 4.
Further examples are:

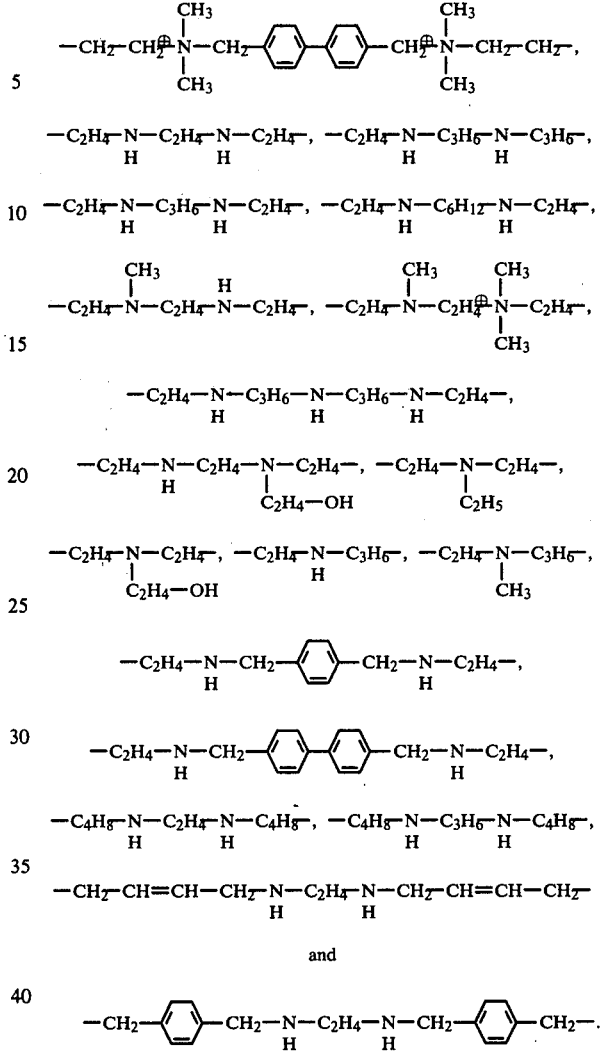

Specific examples of radicals R, in addition to hydrogen, are methyl, ethyl, n- and iso-propyl, n- and iso-butyl, hydroxyethyl, 2-chloroethyl, dimethylaminoethyl, methoxyethyl, ethoxyethyl, methoxyethoxyethyl, phenoxyethoxyethyl, benzyl, xylyl, triethylammoniumethyl, benzyldimethylammoniummethyl, phenyl and tolyl.

Specific examples of radicals $R^1$ and $R^2$ are hydrogen, methyl, ethyl, hydroxyethyl, methoxyethyl, 2-chloroethyl, phenyl, tolyl, benzyl, amino, methylamino, dimethylamino, diethylamino, dipropylamino, dibutylamino, methylethylamino, phenylethylamino, benzylmethylamino, tolylmethylamino, phenylamino, tolylamino, hydroxyethylmethylamino, chloroethylethylamino, acetoxyethylmethylamino and 3-chloro-2-hydroxyethylmethylamino.

Further examples are cyclic aliphatic amine radicals of the formulae

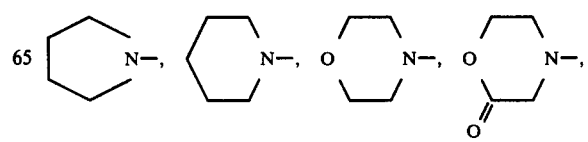

-continued $$CH_3-N\underset{\diagdown\_\_\diagup}{\overset{\diagup\overline{\phantom{xx}}\diagdown}{N}}- \quad \text{and} \quad O_2S\underset{\diagdown\_\_\diagup}{\overset{\diagup\overline{\phantom{xx}}\diagdown}{N}}-.$$

Examples of suitable anions $X^\ominus$ are: fluoride, chloride, bromide, iodide, perchlorate, hydrogen sulfate, sulfate, aminosulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoroborate, acetate, chloroacetate, cyanoacetate, hydroxyacetate, aminoacetate, methylaminoacetate, di- and tri-chloroacetate, 2-chloropropionate, 2-hydroxypropionate, glycolate, thioglycolate, thioacetate, phenoxyacetate, trimethylacetate, valerate, palmitate, acrylate, oxalate, malonate, crotonate, succinate, citrate, methylene-bis-thioglycolate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenylsulfonate and chlorotoluenesulfonate.

A compound of the formula I may be prepared by, for example, reacting a compound of the formula II $$R^1+A-CH_2-A-B+_nA-CH_2-A-R^2 \qquad \text{II}$$

with a compound of the formula III $$A^1-H \qquad \text{III}$$

in the presence of a suitable oxidizing agent.

A compound of the formula I, where $n=1$, is obtained when a urea adduct IV $$A^1-\underset{H}{C}=N-\underset{\overset{\|}{O}}{C}-N=\underset{H}{C}-A^1 \qquad \text{IV}$$

is reacted first with half a mole equivalent of the compound $$HA-B-AH$$

and subsequently, at a higher temperature, with half a mole equivalent of a compound of the formula $$R^1-AH,$$

and the resulting leuco compound of the formula V $$R^1-A-\underset{\overset{|}{A^1}}{CH}-A-B-A-\underset{\overset{|}{A^1}}{CH}-A-R^1$$

is oxidized with a suitable oxidizing agent.

A compound of the formula I, where $n>1$, is obtained when a urea adduct of the formula IV is reacted with one mole equivalent of the compound $$HA-B-AH.$$

Details of the methods of preparation may be found in the Examples, where parts and percentages are by weight, unless stated otherwise.

Examples of compounds of particular importance are those of the formula Ia

[Structure of formula Ia with $2X^\ominus$]

where
the $R^3$'s and $R^4$'s independently of one another are hydrogen, $C_1-C_4$-alkoxy, chlorine, bromine or $C_1-C_4$-alkyl,
$B^1$ is $C_2-C_6$ alkylene, xylylene, butenylene or diphenylene and
R and $X^\ominus$ have the stated meanings.

Further particularly valuable compounds are those of the formula Ib

[Structure of formula Ib]

where
$R^5$ is hydrogen, $C_1-C_4$-alkyl, chlorine or a radical of the formula $$\underset{R}{\overset{N-R,}{|}}$$

$n>1$ and
$B^1$, R, $R^3$ and $X^\ominus$ have the stated meanings.

The compounds of the formula I are violet to green and are preferably used for coloring paper pulp, such as groundwood, and bleached and unbleached sulfite cellulose and sulfate cellulose. As may be seen from the Coloring Examples, the compounds have a high affinity even toward bleached cellulose. Auxiliaries for fixing the dyes need not be added, so that the coloring process causes virtually no pollution of the environment.

EXAMPLE 1

80 parts of the aniline derivative of the formula

[Structure showing diphenylamine derivative with $-N-C_2H_4-N-$ bridge and $C_2H_5$ groups]

are dissolved in 200 ml of glacial acetic acid, 22.5 parts of 40% strength aqueous formaldehyde are added and the mixture is heated for two hours at 60° C. 42 g of dimethylaniline are then added, and after also adding 2 g of chloranil and 2 g of the iron complex of 1,8-dihydro-2,3,9,10-dibenzo-1,4,8,11-tetraaza[14]annulene oxygen is passed through the solution, at 40° C., until 6.6 liters have been absorbed. The reaction does not exhibit any special features compared to the processes described in German Pat. No. 2,152,703, German Published Application DAS 2,334,918 and German Laid-Open Application DOS 2,427,606 and takes place similarly to these. A liquid formulation of the dye of the formula

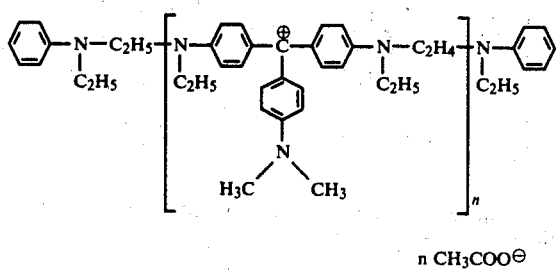

is obtained.

The bluish violet dye is exceptionally suitable for coloring paper. Virtually regardless of the type of paper, the waste water is colorless or only very slightly colored, ie. the dye is virtually completely absorbed.

A similar reaction of an aniline of the formula VI

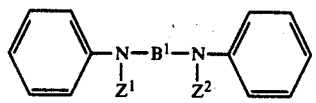

with formaldehyde, followed by condensation with an aniline of the formula

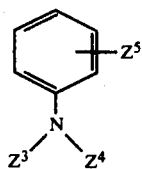

under oxidizing conditions gives the dyes of the formula (1)

(1)

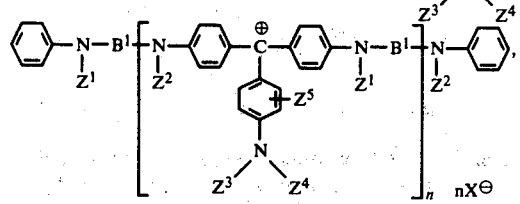

which are characterized, in Table 1 below, in terms of their substituents, the position of $Z^5$ being given relative to the amine radical

The value of n was not determined, because of the considerable expense involved, but in any case appears only to have a slight effect on the tinctorial properties of the product.

The value of n can be varied by adding a chain stopper. Suitable chain stoppers are, for example, anilines of the formula

As already mentioned, the substantivity of the dye obtained is only insignificantly different from that of dyes synthesized in the absence of a chain stopper.

Advantageously, an aniline of the formula $R^1$—AH and formaldehyde are added simultaneously to a solution of an aniline of the formula VI in glacial acetic acid or some other suitable organic solvent, so that the steady state concentration of aniline of the formula $R^1$—AH in the reaction mixture is slight and hence there is very little formation of 4,4'-diaminodiphenylmethane derivatives of the structure

Satisfactory results, especially in the case of relatively small amounts of aniline of the structure $R^1$—AH— are also obtained, however, if formaldehyde, an aniline of the formula VI and an aniline of the formula $R^1$—AH are added all at once and condensed simultaneously.

This procedure is illustrated after Table 1.

If instead of a symmetrical aniline of the formula

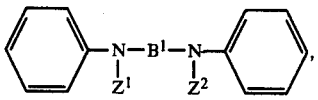

where $Z^1 = Z^2$, an unsymmetrical aniline, in which $Z^1 \neq Z^2$ or in which the benzene rings have different substituents, or the radical $B^1$ is unsymmetrical, is employed, a polymeric dye is obtained in which the starting components are linked in random sequence, as indicated in the formula below for the case where $Z^1 \neq Z^2$:

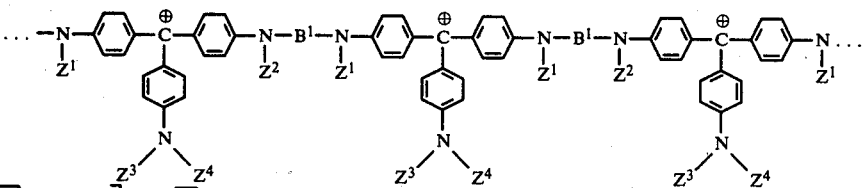

These dyes do not differ substantially, in their technical characteristics, from dyes synthesized from symmetrical anilines.

End groups which may be present in a dye of the formula (I) are, depending on the synthesis employed, radicals

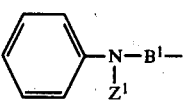

and, if an aniline of the formula $R^1$—AH has been added as a chain stopper, also radicals of the formula

If an aniline of the structure

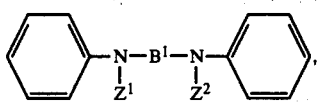

where $Z^1 \neq Z^2$ has been used, radicals of the formula

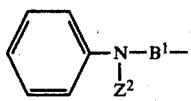

are additionally present as end groups.

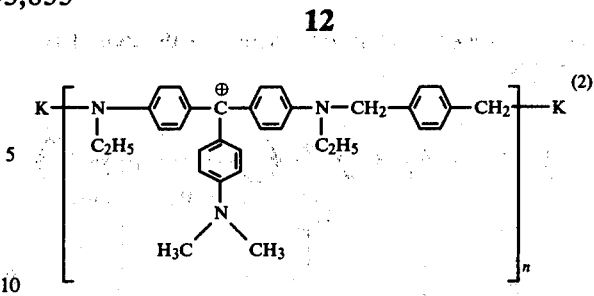

is obtained. In the above formula, the radicals K have the following formulae $$CH_3\text{-}N(CH_3)\text{-}C_6H_4\text{-}C^{\oplus}(...)\text{-}C_6H_4\text{-}N(C_2H_5)\text{-}CH_2\text{-}C_6H_4\text{-}CH_2 = K^1$$

(with the third aryl group bearing $H_3C\text{-}N\text{-}CH_3$)

TABLE 1

| | | Dyes of the formula (I) | | | | |
|---|---|---|---|---|---|---|
| Ex. | $Z^1$ | $Z^2$ | $Z^3$ | $Z^4$ | $Z^5$ | $B^1$ |
| 2 | $CH_3$ | $CH_3$ | $CH_3$ | $CH_3$ | H | $C_2H_4$ |
| 3 | $C_2H_5$ | $C_2H_5$ | " | " | H | $CH_2\text{-}C_6H_4\text{-}CH_2$ |
| 4 | " | " | $C_2H_5$ | $C_2H_5$ | m-Cl | " |
| 5 | " | " | $CH_3$ | $CH_3$ | m-$CH_3$ | " |
| 6 | " | " | " | " | m-Br | " |
| 7 | " | " | $CH_3$ | $C_2H_4$—Cl | o-$CH_3$ | " |
| 8 | CN—$C_2H_4$ | CN—$C_2H_4$ | " | $C_2H_4$—OH | H | " |
| 9 | Cl—$C_2H_4$ | Cl—$C_2H_4$ | " | $CH_3$ | H | " |
| 10 | $C_2H_5$ | $C_2H_5$ | " | " | " | $CH_2$—CH=CH—$CH_2$ |
| 11 | " | " | " | " | " | $(CH_2)_4$ |
| 12 | " | " | $CH_3$ | $C_2H_4$—CN | m-Cl | " |
| 13 | " | " | " | $C_6H_5$ | H | $C_2H_4$ |
| 14 | " | " | " | p-Tolyl | m-Cl | " |
| 15 | " | " | " | $CH_3$ | H | " |
| 16 | " | " | Ethyl | Ethyl | " | " |

EXAMPLE 17

84 parts of the aniline derivative of the formula $$C_6H_5\text{-}N(C_2H_5)\text{-}CH_2\text{-}C_6H_4\text{-}CH_2\text{-}N(C_2H_5)\text{-}C_6H_5$$

are dissolved in 180 ml of glacial acetic acid, the solution is heated to 60° C., 7.2 parts of dimethylaniline and 56 parts of 40% strength aqueous formaldehyde are added simultaneously in the course of one hour, and the mixture is then kept at 60° C. for an hour. Thereafter, 40 parts of dimethylaniline are added, the batch is heated for three hours at 90° C. and then cooled to 40° C., 200 ml of chloroform are added and oxidation is effected under the conditions described in Example 1, until 6.8 liters of oxygen have been absorbed. After distilling off the chloroform, a liquid formulation of the dye of the formula (2)

$$C_6H_5\text{-}N(C_2H_5)\text{-}CH_2\text{-}C_6H_4\text{-}CH_2\text{-} = K^2$$

$$C_6H_5\text{-}N(C_2H_5)\text{-} = K^3$$

and, assuming equal reactivity, are present in the statistical ratio of 2:9:9.

The bluish violet dye obtained may be used for coloring paper and its tinctorial properties show virtually no difference from those of the dye of Example 3.

Similarly, stepwise substitution of dimeric anilines of the formula VI $$C_6H_5\text{-}N(Z^1)\text{-}B^1\text{-}N(Z^2)\text{-}C_6H_5 \quad \text{VI}$$

with 2 mole equivalents of monomeric anilines of the formula

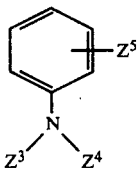

gives dyes which differ only slightly, in their tinctorial properties, from the dyes which are synthesized similarly to Examples 1-16, starting only from dimeric anilines. Table 2 illustrates, for the example of the dye of the formula (2), the effect of varying the ratio of the radicals $K^1$ and $K^3$ on the tinctorial properties. It will be noted that if the proportion of $K^1$ is high the substantivity decreases somewhat, but is nevertheless clearly higher than that of a comparable monomeric dye, for example the dye of the formula

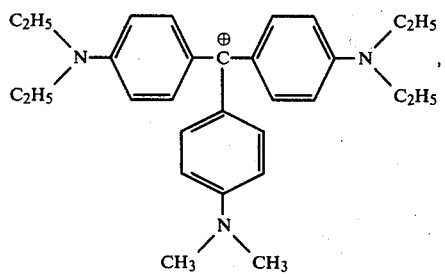

which on bleached sulfite cellulose gives only very pale dyeings, with more than 50% of the dye contained in the waste water.

TABLE 2

| Example | $K^1$ : $K^2$ : $K^3$ | Wet-end coloring of bleached sulfite cellulose, using 1% of dye % of dye in the waste water |
|---|---|---|
| 18 | 1 : 9.5 : 9.5 | <<5 |
| 17 | 2 : 9 : 9 | <5 |
| 19 | 3 : 8.5 : 8.5 | " |
| 20 | 4 : 8 : 8 | " |
| 21 | 6 : 7 : 7 | " |
| 22 | 8 : 6 : 6 | 5 |

Compare Coloring Example No. 52.

EXAMPLE 23

42 parts of o-chlorobenzaldehyde and 9 parts of urea are dissolved in 200 ml of glacial acetic acid at 25° C., and the solution is kept at the same temperature for one hour. 47 hours of the aniline of the formula

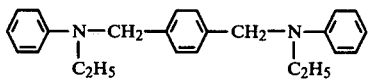

are then added and the mixture is heated at 60° C. for one hour. A further 47 parts of the same aniline are then added and the mixture is heated for three hours at 90° C. and then cooled to 40° C. To dissolve the polymeric precipitate formed, 200 ml of chloroform are added and oxidation is then effected, as described in Example 1, until 3.3 liters of oxygen have been absorbed. A liquid formulation of the dye of the formula

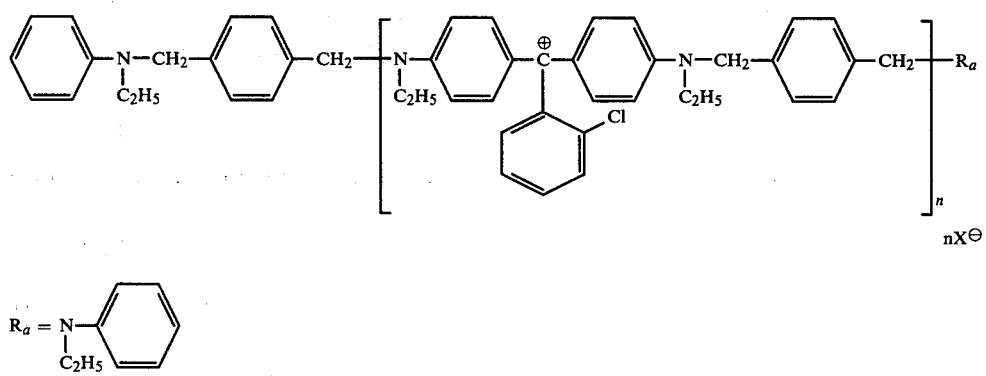

with acetate as the anion is obtained. On evaporating the chloroform present in the reaction mixture, a water-miscible liquid formulation of a brilliant bluish green dye is obtained; the dye has much greater affinity for all types of paper than is shown by comparable monomeric triarylmethane dyes.

A similar reaction of an aldehyde of the formula $$A^1—CHO$$

with urea, followed by reaction with an aniline of the formula VI, and then by oxidation, gives a dye of the formula (3)

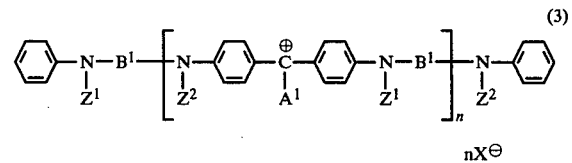

These dyes have a similar structure to those of Example 1 and Table 1. As regards the value of n, and its effect on the tinctorial properties, the remarks made after Example 1 once again apply; so do the comments on the effect of introducing unsymmetrical molecular components on the structure of the polymeric dyes. If anilines of the formula $R^1$—AH are included in the synthesis, so as to control the chain length, the relevant end groups are similar to those in the case of Examples 17 to 22.

Table 3 below lists dyes of the formula (3), where $X^\ominus$ is acetate.

TABLE 3

| Ex. | $Z^1$ | $Z^2$ | $B^1$ | $A^1$ | Hue |
|---|---|---|---|---|---|
| 24 | CH₃ | CH₃ | CH₂—⟨C₆H₄⟩—CH₂ | Phenyl | green |
| 25 | C₂H₅ | CH₂H₅ | " | " | " |
| 26 | C₂H₄—CN | C₂H₄—CN | " | " | " |
| 27 | C₂H₄—OH | C₂H₄OH | " | " | " |
| 28 | CH₃ | C₂H₅ | " | " | " |
| 29 | " | CH₃ | " | o-Chlorophenyl | bluish green |
| 30 | C₂H₄—OH | C₂H₄—OH | " | " | " |
| 31 | " | " | " | o-Tolyl | " |
| 32 | " | " | " | p-Tolyl | " |
| 33 | CH₃ | CH₃ | C₂H₄ | Phenyl | green |
| 34 | " | " | C₄H₈ | " | " |
| 35 | " | " | CH₂—CH=CH—CH₂ | " | " |
| 36 | " | " | " | o-Chlorophenyl | bluish green |
| 37 | " | " | " | p-Tolyl | " |

EXAMPLE 38

32 parts of benzaldehyde and 9 parts of urea are dissolved in 200 ml of glacial acetic acid at 25° C., and the mixture is kept at the same temperature for one hour. 40 parts of the aniline of the formula

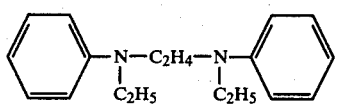

are then added and the mixture is heated for one hour at 60° C. After adding 36 parts of dimethylaniline, the batch is kept for three hours at 90° C. and is then cooled to 40° C., 2 parts of chloranil and 2 parts of the iron complex of 1,8-dihydro-2,3,9,10-dibenzo-1,4,8,11-tetraaza[14]annulene are added and oxygen is passed through the reaction mixture until 3.4 liters have been absorbed.

A liquid formulation of the dye of the formula

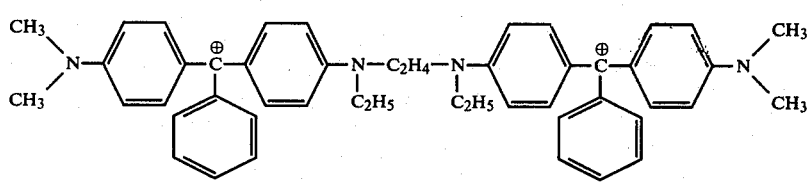

2 CH₃COO⁻ is obtained. The green product may be used to color paper. Compared to malachite green, the novel dye has substantially better substantivity, even on bleached sulfite cellulose.

A similar reaction of an aldehyde of the formula $A^1$—CHO with urea to form bis-benzylideneureas of the formula

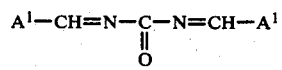

followed by reaction with an aniline of the formula VI

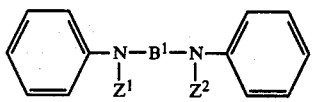          VI and finally with an aniline of the formula

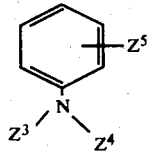

gives a leuco compound of the formula

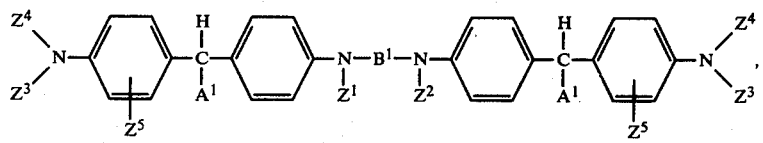

which may be oxidized to a dye of the formula

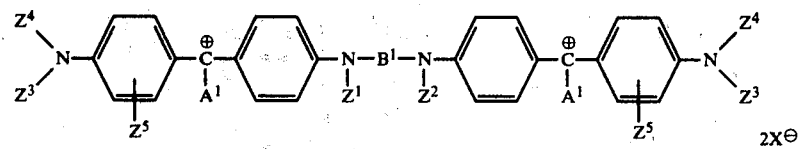

Table 4 gives further examples of dyes of the above formula, where $X^\ominus$ is acetate and $Z^5$ is hydrogen.

Example 1 is followed, a liquid formulation of the dye of the formula

TABLE 4

| Ex. | $Z^1$ | $Z^2$ | $Z^3$ | $Z^4$ | $A^1$ | $B^1$ | Hue |
|---|---|---|---|---|---|---|---|
| 39 | CH₃ | CH₃ | CH₃ | CH₃ | Phenyl | C₂H₄ | green |
| 40 | " | " | C₂H₅ | C₂H₅ | " | " | " |
| 41 | " | " | C₂H₄OH | " | " | " | " |
| 42 | " | " | p-Tolyl | CH₃ | " | " | " |
| 43 | " | " | CH₃ | " | o-Chlorophenyl | " | bluish green |
| 44 | " | " | " | " | " | CH₂—⟨⟩—CH₂ | " |
| 45 | " | " | " | " | " | C₄H₈ | " |
| 46 | " | " | " | " | " | CH₂—CH=CH—CH₂ | " |
| 47 | " | " | " | " | " | CH₂—⟨⟩ / CH₂ (ortho) | " |
| 48 | " | " | " | " | " | C₆H₁₂ | " |
| 49 | " | " | " | " | p-Tolyl | CH₂—⟨⟩—CH₂ | " |
| 50 | " | " | " | " | o-Tolyl | " | " |
| 51 | " | " | " | " | Phenyl | " | " |

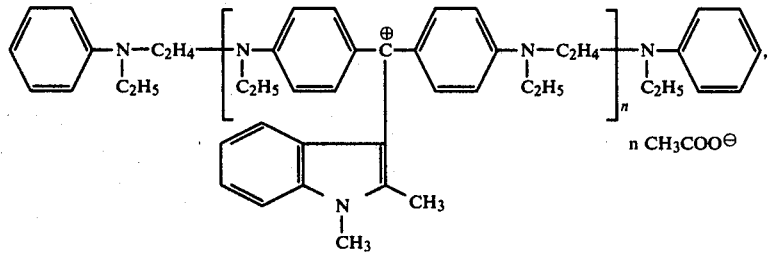

EXAMPLE 52

50 ml of a 1 percent strength solution of the dye of Example 1 are added to 1,000 g of a 2.5 percent strength suspension of bleached sulfite cellulose in water, and the mixture is stirred for one minute. A paper sheet weighing 50 g/m² is then made. The paper has an intense green hue and the water water is only very slightly colored.

EXAMPLE 53

If, in Example 52, the dye from Example 1 is replaced by the dye from Example 17 or 18, the waste water is virtually colorless, ie. the dye is absorbed quantitatively.

EXAMPLE 54

If 50 g of 1,2-dimethylindole are employed in place of 42 g of dimethylaniline in the reaction mixture of Example 1, and in other respects the procedure described in Example 1 is followed, a liquid formulation of the dye of the formula is obtained. This formulation colors paper pulp in blue hues, and gives a slightly colored waste water, ie. the dye is absorbed virtually completely.

A similar reaction of an aniline of the formula VI

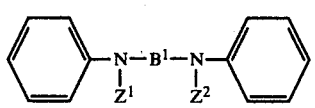

VI with formaldehyde, followed by condensation with a heterocyclic compound of the formula MH under oxidizing conditions, gives dyes of the formula

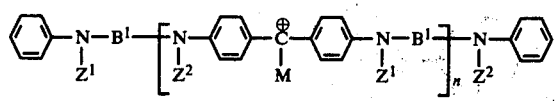

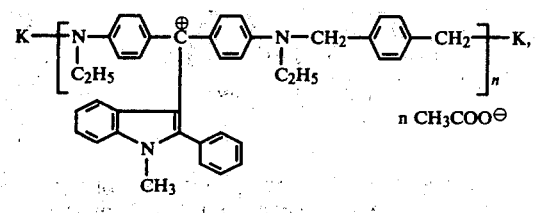

$n\ CH_3COO^{\ominus}$ which are identified in Table 5 below in terms of their substituents.

TABLE 5

| Ex. | $Z^1$ | $Z^2$ | M | $B^1$ | Hue |
|---|---|---|---|---|---|
| 55 | $CH_3$ | $CH_3$ | (indole with 3-CH₃, 2-CH₃, N-CH₃) | $C_2H_4$ | blue |
| 56 | " | " | " | $CH_2$–⌬–$CH_2$ | " |
| 57 | " | " | (indole with 3-CH₃, 2-Ph, N-CH₃) | " | " |
| 58 | " | " | (indole with 3-CH₃, 2-CH₃, N-H) | " | " |
| 59 | " | " | (pyrazolone with CH₃, N-CH₃, N-Ph) | " | bluish violet |
| 60 | " | " | (dihydroquinoline structure) | " | bluish violet |
| 61 | $C_2H_5$ | $C_2H_5$ | (tetrahydroquinoline structure) | —$C_2H_4$— | bluish violet |

As regards the structure and end groups of the dyes listed in Table 5, comments similar to those made after Example 1 apply.

EXAMPLE 62

If 68 parts of 1-methyl-2-phenylindole in place of 40 parts of dimethylaniline are added to the reaction mixture from Example 17, but in other respects the procedure of Example 17 is followed, a liquid formulation of a dye of the formula is obtained, which is exceptionally suitable for coloring paper. The comments made in Example 17 concerning the structure of the radicals K also apply here.

EXAMPLE 63

If 43 parts of 1,2-dimethylindole in place of 36 parts of dimethylaniline are added to the reaction mixture from Example 38, but in other respects the procedure of Example 38 is followed, a liquid formulation of a green dye of the formula

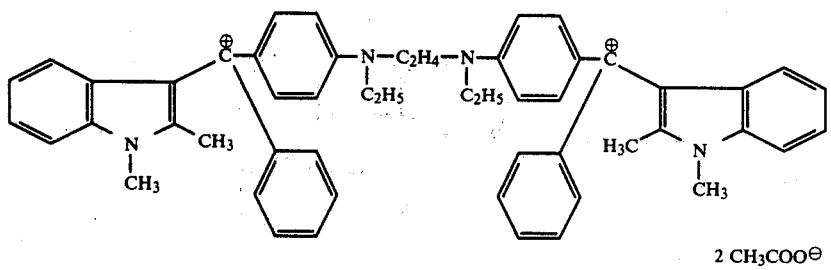

2 CH$_3$COO$^\ominus$ is obtained, which is very suitable for coloring paper.

A similar reaction of an aldehyde of the formula

A$^1$—CHO with urea, to form a bis-benzylideneurea of the formula

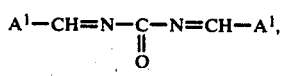

followed by reaction with an aniline of the formula VI

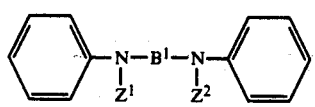

and final reaction with a hetero-aromatic compound of the formula MH gives a leuco compound of the formula

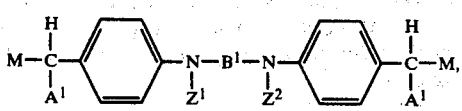

which, on oxidation, gives a dye of the formula

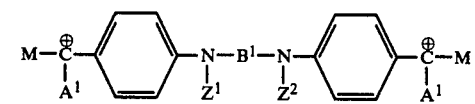

2X$^\ominus$

Table 6 gives further examples of dyes of the above formula, where X$^\ominus$ is acetate.

TABLE 6

| Ex. | Z$^1$ | Z$^2$ | M | A$^1$ | B$^1$ | Hue |
|---|---|---|---|---|---|---|
| 64 | CH$_3$ | CH$_3$ | [1,2-dimethylindol-3-yl] | phenyl | —C$_2$H$_4$— | green |
| 65 | " | " | " | " | —CH$_2$—C$_6$H$_4$—CH$_2$— | " |
| 66 | " | " | [1-methyl-2-phenylindol-3-yl] | " | " | " |
| 67 | " | " | " | 2-chlorophenyl | " | " |
| 68 | " | " | " | 2,6-dichlorophenyl | " | " |

EXAMPLE 69

35 parts of 1,2-dimethylindole-3-carbaldehyde and 18 parts of urea are dissolved in 250 parts of glacial acetic acid at room temperature and kept thereat for one hour. The mixture is then heated to 60° C. and 29 parts of 1,2-dimethylindole are added. After one hour at 60° C., the mixture is heated for one hour at 90° C., 27 parts of the aniline of the formula

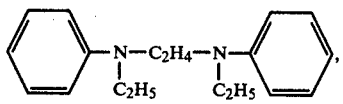

2 g of chloranil and 2 g of the catalyst from Example 1 are added and oxygen is passed through the reaction solution, at 40° C., until 5.0 liters have been absorbed. A liquid formulation of the dye of the formula

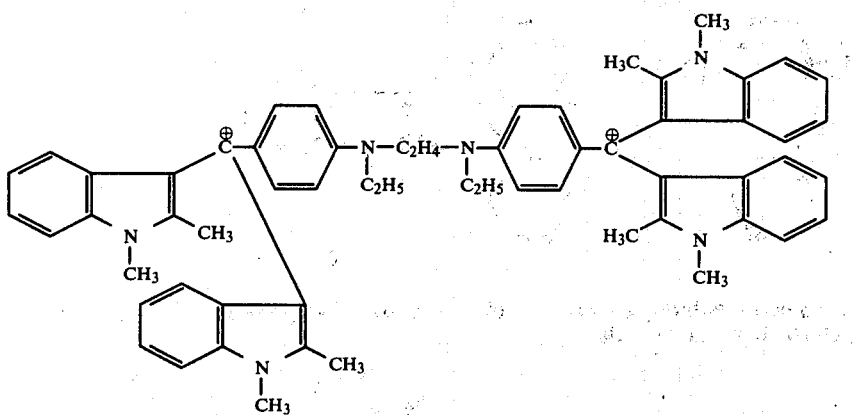

2 CH₃COO⊖ is obtained, which is exceptionally suitable for coloring paper in bluish green hues.

A similar reaction of a heterocyclic aldehyde of the formula

with urea, to form a bis-condensate of the formula

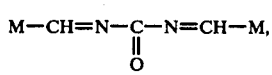

followed by reaction with a heterocyclic compound of the formula MH, gives a tetraadduct of the formula

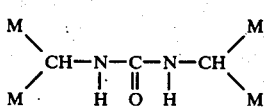

which on reaction with an aniline of the formula

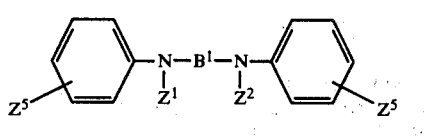

produces a leuco compound of the formula

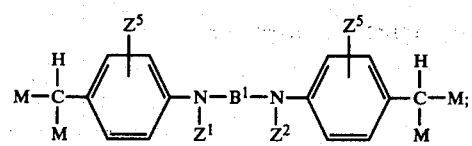

this, on oxidation, gives a dye of the formula

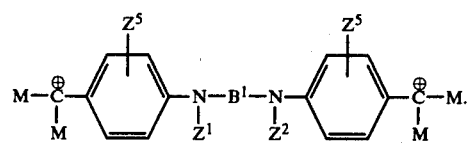

Table 7 lists further examples of the above formula, where $Z^5$ is hydrogen and $A^\ominus$ is acetate.

TABLE 7

| Ex. | $Z^1$ | $Z^2$ | $B^1$ | M | Hue |
|---|---|---|---|---|---|
| 70 | CH₃ | CH₃ | —CH₂—⟨phenyl⟩—CH₂— | indole-N(CH₃)-2-Ph | bluish green |
| 71 | " | " | —C₄H₈— | " | bluish green |
| 72 | C₂H₅ | CH₃ | —CH₂—CH=CH—CH₂— | " | bluish green |
| 73 | " | C₂H₅ | —CH₂—⟨phenyl⟩—CH₂— | 3,3-diCH₃-indoline-N-CH₃ =CH— | bluish green |

Of course, dyes where the radicals M are different from one another may also be synthesized by employing an aldehyde M—CHO and a heterocyclic compound MH which differ from one another in respect of the meaning of M.

We claim:
1. A cationic dye of the formula

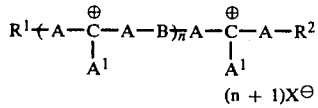

$$(n + 1)X^{\ominus}$$

wherein
n is an integer equal to or greater than 1; where the radicals A, $A^1$ and B are identical or different and
A is unsubstituted or substituted benzene or heteroaromatic,
$A^1$, if n=1, is unsubstituted or substituted heteroaromatic or is aryl which is unsubstituted or substituted by alkyl, aryl, cycloalkyl, chlorine, bromine, hydroxyl, alkoxy, aryloxy, nitro, hydroxycarbonyl, alkoxycarbonyl or aminocarbonyl, and if n>1, $A^1$ may also be aryl substituted by unsubstituted or substituted amino,
B is a bridge member of the formula

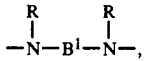

where the R's are the same or different and are selected from the group consisting of hydrogen; $C_1$–$C_4$-alkyl which is unsubstituted or substituted by chlorine, bromine hydroxyl, $C_1$–$C_4$-alkoxy, phenyl or tolyl; cycloalkyl; phenyl and tolyl,
$B^1$ is a bridge member which may or may not be quaternized,
$R^1$ and $R^2$ are hydrogen, unsubstituted or substituted alkyl, cycloalkyl, aryl, alkoxy or amino, and
$X^{\ominus}$ is an anion.

* * * * *

UNITED STATES PATENT AND TRADEMARK OFFICE
CERTIFICATE OF CORRECTION

PATENT NO. : 4,353,833

DATED : October 12, 1982

INVENTOR(S) : Horst Bruder et al.

It is certified that error appears in the above-identified patent and that said Letters Patent is hereby corrected as shown below:

On the title page
Please correct the following Foreign Application Priority Data:

[30] -- Foreign Application Priority Data

Dec. 20, 1979 [DE] Fed. Rep. of Germany.... 2951353 --

Signed and Sealed this

Fourteenth Day of December 1982

[SEAL]

Attest:

GERALD J. MOSSINGHOFF

Attesting Officer

Commissioner of Patents and Trademarks